United States Patent Office 3,374,423
Patented Mar. 19, 1968

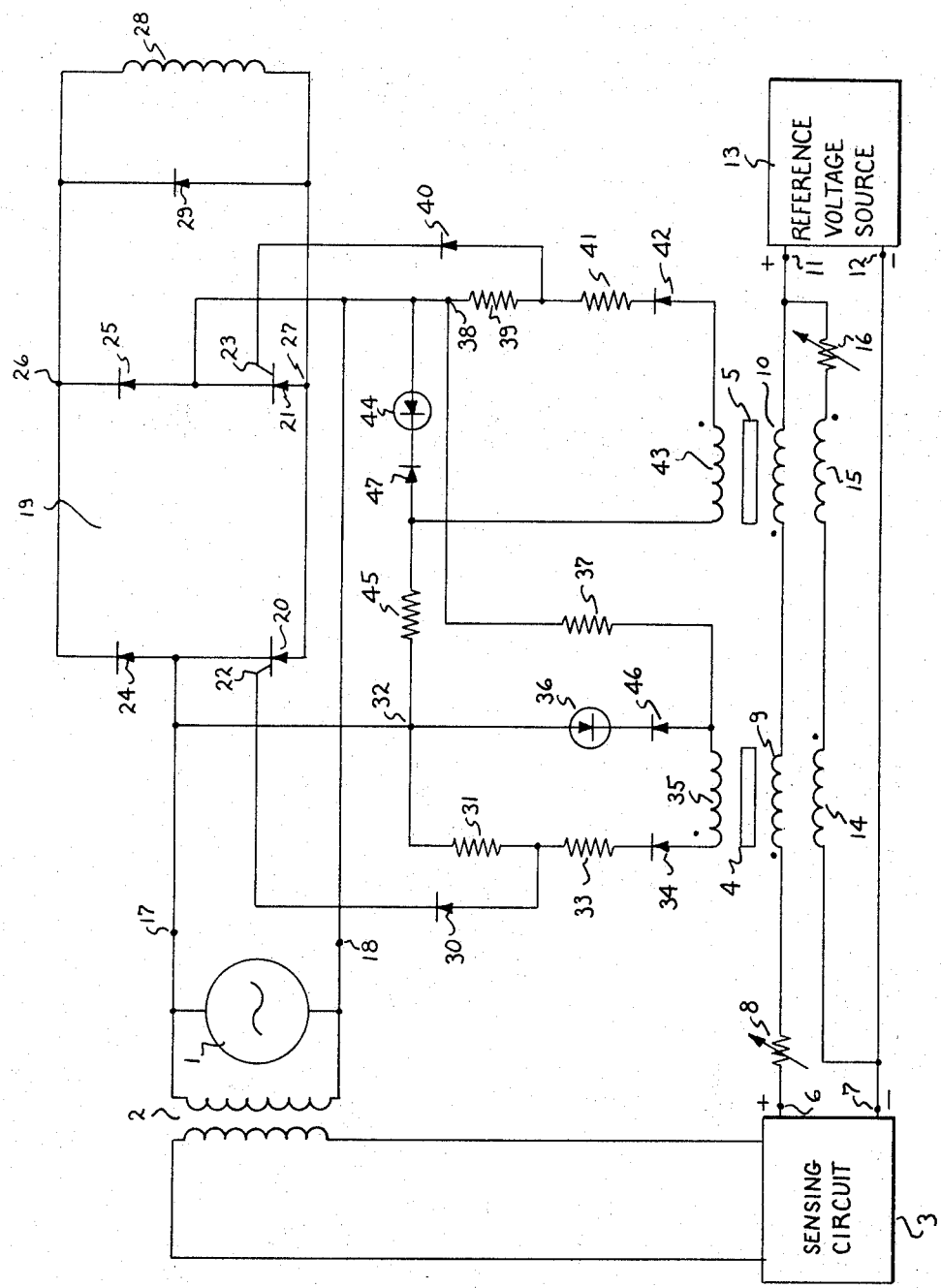

3,374,423
SCR POWER SUPPLY REGULATOR TRIGGERED BY MAGNETIC AMPLIFIERS
Stuart F. Hemmenway, Scotia, N.Y., assignor to General Electric Company, a corporation of New York
Filed May 3, 1965, Ser. No. 452,734
2 Claims. (Cl. 323—22)

ABSTRACT OF THE DISCLOSURE

A regulating circuit has a magnetic amplifier for each silicon-controlled rectifier and a regulated, half-wave voltage supply for each magnetic amplifier. The regulated voltage supply includes a zener diode having the anode thereof connected to the cathode of each silicon-controlled rectifier. Circuit means interconnect the gate winding of the magnetic amplifier and the regulated voltage supply with the gate circuit of the silicon-controlled rectifier to control the current flow through the silicon-controlled rectifier. Thus, when the silicon-controlled rectifier is forward-biased by the A-C supply and the magnetic amplifier saturates, gate current flows through the gate circuit of the silicon-controlled rectifier to fire it and energize the load. The use of the individual half-wave voltage sources with zener diodes obviates expensive voltage isolation devices and by selecting the magnitude of voltage of the half-wave voltage source to be much less than the magnitude of average voltage of the A-C source, the gate circuit is made substantially independent of undesirable transient fluctuations in the magnitude of A-C source voltage.

My invention relates to regulator circuits, and, more specifically, to regulator circuits which utilize magnetic amplifiers.

My invention is particularly useful in regulator circuits in which an electrically energizable device, or load, is energized by an A-C source connected thereto by a plurality of gate-controlled conducting devices that control the magnitude of power delivered to the load in response to the timing of trigger signals from magnetic amplifiers. In regulator circuits of this kind, a sensing means couples a characteristic quantity of the load to the magnetic amplifiers where it is compared with a reference quantity. The difference between these quantities controls the time delay or the point in the A-C supply voltage cycle at which the energy from the A-C supply is applied to the load. In this way, the characteristic quantity of the load can be controlled or maintained substantially constant, for example.

The magnetic amplifiers ordinarily used each employ a core of the square hysteresis loop type, and each has a gate winding, a control winding, and a bias winding. The bias winding is energized by a constant reference voltage to determine a reference energy level for the core of the magnetic amplifier. The control winding causes the energy level of the magnetic core to change in accordance with the magnitude of voltage at the sensing means. Each of the gate windings is connected to a gate circuit of one gate-controlled conducting device to fire the conducting device when the magnetic core saturates. At this time, the impedance of the gate winding decreases to allow a firing current to be conducted from a voltage source and through the gate circuit.

In some prior art regulator circuits the voltage source supplies the firing current directly from the A-C supply to the gate winding. Thus, where the A-C supply is a high voltage generator, a high voltage is coupled across the gate windings and necessitates the use of expensive high voltage magnetic amplifiers. Furthermore, when one conducting device fires, it temporarily decreases the voltage of the A-C supply. This transient condition tends to cut off the flow of current to the gate windings and interrupts the firing cycles for the conducting devices.

Other prior art regulator circuits use step-down transformers to couple energy from the A-C supply to the gate windings. While with this type of regulator circuit a smaller, low energy magnetic amplifier can be used, as opposed to the aforementioned prior art circuit, the step-down transformers require current-feedback windings so that, when the conducting devices fire and decrease the voltage of the A-C supply, the current continues to flow through the gate windings. These regulators also require a second transformer to isolate each of the magnetic amplifier gate winding circuits to prevent a misfiring of the conducting devices. These transformers add to the expense and the bulk of the regulator circuit.

It is an object of my invention to provide an improved regulator circuit which is substantially independent of the voltage of an A-C voltage source from which it is energized.

It is another object of my invention to provide a regulator circuit employing magnetic amplifiers in which a plurality of gate winding voltage supplies isolate a corresponding plurality of gate winding circuits from each other without requiring isolation transformers.

It is a further object of my invention to provide a regulator circuit employing magnetic amplifiers having improved, reliable gate winding voltage supplies which allow the use of low energy magnetic amplifiers.

Briefly stated, and in accordance with one aspect of my invention, I provide in a regulating circuit of the type described above a magnetic amplifier for each gate-controlled conducting device and a regulated, half-wave voltage supply for each magnetic amplifier. This half-wave voltage supply is energized by the A-C source which is connected across the corresponding gate-controlled conducting device. Circuit means interconnect the gate winding of the magnetic amplifier and the regulated voltage supply with the gate circuit of the conducting device to control the current flow through the conducting device. Thus, when the conducting device is forward biased by the A-C supply and the magnetic amplifier saturates, gate current flows through the gate circuit of the conducting device to fire it and energize the load. The use of individual half-wave voltage sources obviates expensive voltage isolation devices and by selecting the magnitude of voltage of the half-wave voltage source to be much less than the magnitude of average voltage of the A-C source, the gate circuit is made substantially independent of undesirable transient fluctuations in the magnitude of A-C source voltage.

While the specification concludes with claims particularly pointing out and distinctly claiming the subject matter which I regard as my invention, it is believed the invention will be understood from the following description taken in connection with the accompanying drawing in which the figure is a schematic diagram of a regulator circuit made in accordance with one embodiment of my invention.

In a preferred embodiment of my invention a voltage regulator circuit is shown for controlling the operation of rotating electrical machinery. A voltage to be regulated is coupled from a voltage source shown as a single phase armature 1 of the electrical machine and through a transformer 2 to a sensing circuit 3. The sensing circuit 3 converts the regulated voltage to the magnitude and polarity of voltage which can be utilized by the regulator circuit. While a single phase system has been selected as the illustrative embodiment for simplicity and clarity, the invention extends equally to polyphase systems.

Where the rotating machinery is an A-C generator, the transformer 2 acts as an isolation transformer to isolate the sensing circuit 3 from the power circuits which are fed by the generator. Furthermore, the transformer 2 steps down the voltage from the armature 1 so that the sensing circuit 3 and magnetic amplifiers 4 and 5 operate at a low voltage level. By substituting appropriate step-down transformers for the transformer 2 so that the voltage at the sensing circuit remains in one voltage range, this regulating circuit may be used with A-C generators of any rating.

The sensing circuit 3 may include a rectifier circuit and a filter circuit which converts the A-C voltage from the armature 1 to a D-C voltage at terminals 6 and 7 of the sensing circuit 3. The sensing circuit also may include a potentiometer to adjust the magnitude of the voltage across the terminals 6 and 7. A suitable sensing circuit of this type is shown and described in patent application S.N. 376,648, filed June 22, 1964, entitled "Voltage Regulator" and assigned to the assignee of the present invention. It is generally desired that the output of sensing circuit 3 be a D-C voltage proportional in magnitude to the average magnitude of A-C input voltage. Where the machinery or other load which is regulated is of the three-phase type, the transformer 2 and the sensing circuit 3 may be modified to accommodate it. Of course, where the regulated load is a D-C apparatus, such as a D-C motor, the transformer 2 is not used and filter and rectifier circuits are not needed.

For some applications it may be advantageous to provide feedback windings (not shown) for the magnetic amplifiers to provide either positive and/or negative feedback of regulator output voltage, current, or both. It is well known in the art to utilize such feedback and the results are oftentimes greater sensitivity while at the same time achieving improved stability, for example.

The sensing circuit D-C output voltage is coupled from the terminals 6 and 7, through a variable resistance, or rheostat 8, and through control windings 9 and 10 of the magnetic amplifiers 4 and 5, respectively, and across terminals 11 and 12 of a reference voltage source 13. Source 13 can be a battery connected to oppose the voltage of circuit 3, but is more conveniently selected to be a Zener diode power supply, as described in the aforementioned patent application. Bias windings 14 and 15 of the magnetic amplifiers 4 and 5, respectively, are coupled through a variable resistance, or rheostat 16, and across the terminals 11 and 12 of the reference voltage source 13. The control windings 9 and 10 compare the voltage at the sensing circuit 3 with that at the reference voltage source and energize the magnetic cores of the magnetic amplifiers 4 and 5 in accordance with the difference between them.

The rheostat 8 controls the current through the control windings 9 and 10 and thus adjusts the sensitivity and amplification factor of the magnetic amplifiers 4 and 5. Under normal full load operating conditions the voltage at the terminal 11 of the reference voltage source 13 is higher than that at the terminal 6 of the sensing circuit 3, because of the dropping control characteristic. In accord with convention, current can be considered to flow from the terminal 11 and through the control windings 10 and 9 and the rheostat 8 to the terminal 6. Current also flows from terminal 11 and through the bias windings 15 and 14 to the terminal 12. The conventional "dot" notation system is used to mark the windings in accordance with their effects on the magnetic cores of the amplifiers. It can be seen that the saturation effects of the current in the control windings 9 and 10, which flows out of the dots, on the saturable cores of the magnetic amplifiers 4 and 5 are opposed by the saturation effects of the current in the bias windings 14 and 15, which flows into the dots.

The energy level of the magnetic cores depends upon the difference in the volt-second area of the voltage applied to the bias and control windings. For some applications of my invention it may be advantageous to use a single control winding and a single bias winding, each of which is wound around the cores of both of the magnetic amplifiers 4 and 5. Where it is desired to use a regulator circuit made in accordance with my invention to control the speed of a D-C motor, the polarity of the control windings must be reversed since the field excitation of the D-C motor is reduced to increase the speed.

The reference voltage source 13 may comprise a regulated voltage source which is energized by an A-C supply. In the application of my invention where the regulator controls an A-C generator, the voltage supply may include the armature of the A-C generator itself and advantageously includes a solid state D-C reference source.

In the application illustrated, an A-C supply voltage is connected across power input terminals 17 and 18 which are connected to a bridge circuit 19. However, when the regulator circuit of my invention is used for other purposes, an independent A-C voltage supply may be required across the terminals 17 and 18. Of course, such an independent A-C voltage supply could also be utilized in the present system.

The bridge circuit 19 comprises a pair of gate-controlled conducting devices, shown as SCR's 20 and 21 having gate electrodes 22 and 23, respectively, and a pair of rectifiers 24 and 25. The output from the bridge 19 is coupled from bridge terminals 26 and 27 to energize a load. When the load is the field of an A-C generator, a field winding 28 thereof is connected across the terminals 26 and 27 to be energized by the bridge 19. A free-wheeling diode 29 is connected across the field winding 28 to prevent reverse induced voltage damage to the circuit components under certain transient conditions.

The initiation of conduction, or firing, of the gate-controlled conducting devices 20 and 21 is controlled by the magnetic amplifiers 4 and 5, respectively. The gate electrode 22 of the SCR 20 is connected through a diode 30, a resistance 31, and a junction point 32 to the cathode of the SCR 20. When a sufficient voltage difference is present across the resistance 31, a gate current flows through the gate electrode 22 to fire the SCR 20.

The resistance 31 is connected through a resistance 33 and preferably through reverse-current blocking diode 34 to one extremity of a gate winding 35 of the magnetic amplifier 4. This magnetic amplifier controls the time delay before the voltage across the resistance 31 abruptly increases and thus controls the timing of the gate current flow through the gate electrode 22 of the SCR 20 sufficient to initiate conduction of the latter.

A half-wave, regulated voltage supply comprising a zener diode 36 and a voltage dropping resistance 37 is connected across terminals 17 and 18. The zener diode 36 has a low zener, or reverse breakdown, voltage relative to the average voltage difference between terminals 17 and 18 so that substantially all, and preferably more than 90%, of the average voltage coupled from the terminals 17 and 18 appears across resistance 37. Thus, the magnetic amplifier 4 can operate at a low voltage level and is not disturbed by undesired transient fluctuations in the A-C supply voltage magnitude. Since a substantial portion of the A-C supply voltage appears across the resistance 37, the regulated power supply is essentially unaffected if a heavy demand for electric power by the load causes the voltage from the A-C power supply at the power input terminals 17 and 18 to be reduced. Therefore, the cycle of the power supplied to the gate winding 35 to control the firing of the SCR 20 will be essentially unaffected by transient supply voltage conditions.

When the terminal 18 is positive with respect to the terminal 17, a voltage difference appears across the opposed terminals of zener diode 36 and the SCR 20 is forward biased. Before the core of the magnetic amplifier 4 saturates, the impedance of the gate winding 35 is large, and only a small current flows therethrough. This current flows out of the dot so that it tends to saturate the core of the magnetic amplifier 4 in the same direction as does the current flow through the control winding 9 when the sensor voltage is less than the reference voltage. The current flow through the gate winding 35 does not develop a high enough voltage across the resistance 31 to cause the SCR 20 to fire. When the core of the magnetic amplifier saturates, the impedance of the gate winding 35 drops so that a larger current flows through the diode 34 and the resistor 33 to develop a relatively larger voltage across the resistor 31. At this time a sufficient gate current flows through the diode 30 and the gate electrode 22 to fire the SCR 20. Thus, load current flows from the terminal 18 and through the diode 25, the bridge terminal 26, the field winding 28, and the SCR 20 to the terminal 17 to energize the A-C generator field.

In a similar manner, current flows from the cathode of the SCR 21 and through the junction point 38, a resistance 39, and the diode 40 to the gate electrode 23. When a sufficient voltage difference appears across the resistance 39, the current flowing through the gate electrode 23 fires the SCR 21 to energize the load. The resistance 39 is connected through a resistance 41 and a diode 42 to one side of a gate winding 43 of the magnetic amplifier 5.

Current is provided for the resistance 39 by a regulated, half-wave, voltage supply comprising a zener diode 44 and a dropping resistance 45. This regulated, half-wave voltage supply is connected across the other side of the gate winding 43 and the junction point 38 at the power input terminal 18. Voltage from the A-C voltage supply is also coupled from the power input terminal 17 and through the junction point 32 to the resistance 45. The zener diode 44 and th gate winding 43 control the con-average voltage between terminals 17 and 18, so that the resistance 45 drops a substantial portion of the A-C supply voltage at the terminals 17 and 18. Thus, the magnetic amplifier 5 also operates at a low voltage and the regulated half-wave supply is unaffected by heavy loads at the A-C voltage supply.

When the polarity of the voltage at the terminal 17 is positive with respect to that at the terminal 18, and thus the SCR 21 is forward biased, the half-wave voltage at the zener diode 44 and the gate winding 43 control the conduction of the SCR 21 in a manner similar to that described above with respect to the control of the SCR 20. Thus, before the core of the magnetic amplifier 5 saturates, a small voltage is developed across the resistance 39 and any current flowing through the gate electrode 23 is insufficient to fire the SCR 21. However, when the magnetic amplifier 5 saturates and the impedance of the gate winding 43 is abruptly reduced, a relatively larger voltage is developed across the resistance 39. Thus, gate current flows through the diode 40 and the gate electrode 23 to fire the SCR 21. A load current flows from the power input terminal 17 and through the diode 24, junction point 26, the field winding 28 and the SCR 21 to the power input terminal 18 to energize the load. Diodes 46 and 47 are advantageously connected in series with zener diodes 36 and 44, respectively, to block current during the dormant half cyc'es to ensure adequate core reset voltage for amplifiers 4 and 5, respectively.

In operation, the voltage at the armature 1 is coupled through the transformer 2 to the sensing circuit 3. The output voltage across the terminals 6 and 7 of the sensing circuit 3 is compared with the voltage at the reference voltage source 13, and a current flows through the control windings 9 and 10 in accordance with the difference between these voltages. A current also flows through the bias windings 14 and 15 to oppose the effects of the control windings 9 and 10 on the cores of the magnetic amplifiers 4 and 5 in the usual full load condition when the sensor output voltage exceeds the reference voltage. Rheostat 16 is advantageously adjusted to provide a firing delay of about 150 electrical degrees in the absence of current through control windings 9 and 10. Together the control and bias windings set the cores at an energy level which is indicative of the magnitude of the voltage at the armature 1. When the terminal 18 is positive in polarity with respect to terminal 17 and a half-wave, regulated D-C voltage is developed across the zener diode 36, a small current begins to flow through the gate winding associated therewith. For example, when a voltage is developed at the zener diode 36, a small substantially constant current flows through the gate winding 35 to the resistance 33. The current drives the core of the magnetic amplifier 4 toward saturation in the same direction as does the current which normally flows from the reference voltage source 13 and through the control windings 9 and 10. The corresponding conducting device, SCR 20, is forward biased by the voltage across terminals 17 and 18.

When a decrease in the average voltage magnitude at the armature 1 causes the magnitude of voltage across the terminals 6 and 7 of the sensing circuit 3 to be reduced, the current flow through the control windings 9 and 10 increases in magnitude to provide an added effect on the cores of the magnetic amplifiers 4 and 5. Assuming that the terminal 18 is positive in polarity with respect to the terminal 17, the increased flow through the winding 9 causes the core of the magnetic amplifier 4 to saturate earlier in the cycle of the applied A-C voltage. Therefore, gate current flows through the gate electrode 22 to turn on the SCR 20 earlier in the half-cycle of the A-C voltage supply. Thus, a greater amount of energy is transferred to the field winding 28 which, in the case of an A-C generator, raises the average voltage magnitude at the armature 1 providing compensation.

When the voltage at the armature 1 increases in average magnitude so that the voltage across the terminals 6 and 7 of the sensing circuit 3 increases correspondingly, the current flowing through the control windings 9 and 10 decreases. The cores of the magnetic amplifiers 4 and 5 are now less energized by these windings. Thus, the current flowing through the gate winding 35 saturates the core of the magnetic amplifier 4 later in the cycle of the voltage at the zener diode 36, and the SCR 20 is turned on later in the cycle. This causes less energy to be delivered to the field winding 28 so that where the load is an A-C generator, the voltage at the armature 1 decreases in average magnitude.

There has been described herein a particularly advantageous firing circuit, for a gate-controlled semiconductor device, that features a rugged and reliable magnetic amplifier. The firing circuit features a series loop network including a semiconductive voltage reference device that is preferably a zener diode, a gate winding of the magnetic amplifier and two resistances which could as well be a single tapped resistance. The anode of the semiconductive voltage reference device is conductively coupled to the cathode of the controlled device and the cathode of the reference device is resistively coupled to the anode of the controlled device. The firing circuit is completed by coupling the junction between the resistances to the gate electrode of the controlled device. In this way the firing circuit is energized by the A-C source to be controlled and yet is not affected by fluctuations in the average voltage of the A-C source or transient variations therein. In addition, isolation means between firing circuits are obviated when a plurality of controlled devices are utilized as in full-wave and/or polyphase system regulation. The entire circuit, exclusive of the magnetic amplifier, is readily adapted to circuit board or integrated circuit techniques, since no inductances or capacitances are required.

My invention is not limited to the particular details of the embodiment illustrated, and I contemplate that various modificaions and applications will occur to those skilled in the art. It is therefore my intention that the appended claims cover such modifications and applications as do not depart from the direct spirit and scope of my invention.

What I claim as new and desire to secure by Letters Patent of the United States is:

1. An electric regulator for controlling the quantity of electric power supplied to a load by an A-C power supply, said regulator circuit comprising:
   a plurality of silicon-controlled rectifiers connected to said A-C power supply and to said load providing a quantity of electrical power to said load that varies in the opposite direction as variations in the time delay, relative to the cycles of said A-C power supply, of conduction-initiating signals supplied to the gates of said silicon-controlled rectifiers;
   a firing circuit for at least one of said silicon-controlled rectifiers comprising a magnetic amplifier having a control winding and a gate winding;
   sensing means responsive to said load for providing a magnitude of energization for said control winding responsive to a sensed characteristic of said load;
   a regulated, half-wave voltage supply resistively coupled to said A-C power supply;
   said half-wave voltage supply including a zener diode having the anode thereof connected to the cathode of each rectifier;
   a series loop circuit including said half-wave voltage supply and said gate winding; and
   circuit means coupling said series loop circuit to a gate of said one silicon-controlled rectifier to provide conduction-initiating signals to initiate conduction thereof in response to saturation of the core of said magnetic amplifier.

2. The regulator of claim 1 wherein said series loop circuit includes two resistances in addition to said half-wave voltage supply and said gate winding and the gate of said rectifier is coupled to the junction of said resistances.

References Cited
UNITED STATES PATENTS

| | | | |
|---|---|---|---|
| 3,161,817 | 12/1964 | Carlson | 322—28 |
| 3,222,585 | 12/1965 | Lobb | 328—89 X |
| 3,223,922 | 12/1965 | Borden | 323—22 |
| 3,252,077 | 5/1966 | Schonholzer et al. | 323—22 |

JOHN F. COUCH, *Primary Examiner.*

A. D. PELLINEN, *Examiner.*